United States Patent [19]

Parker et al.

[11] Patent Number: 4,889,563

[45] Date of Patent: Dec. 26, 1989

[54] PROCESS FOR RETARDING AND CONTROLLING THE FORMATION OF GELS OR PRECIPITATES DERIVED FROM ALUMINIUM AND CORRESPONDING COMPOSITIONS, PLUS THE CORRESPONDING APPLICATIONS—IN PARTICULAR REGARDING OIL WELLS

[75] Inventors: Alan Parker, St Etienne, France; Colin Davidson, Rijswijk, Netherlands

[73] Assignee: Dowell Schlumberger Incorporated, Tulsa, Okla.

[21] Appl. No.: 881,147

[22] Filed: Jul. 2, 1986

[30] Foreign Application Priority Data

Jul. 2, 1985 [FR] France ............................. 85 10272
Apr. 30, 1986 [FR] France ............................. 86 06434

[51] Int. Cl.$^4$ ............................................. C09K 3/00
[52] U.S. Cl. ............................. 106/287.17; 106/900
[58] Field of Search .................. 556/186, 178, 180; 424/47, 157, 158; 106/287.17

[56] References Cited

U.S. PATENT DOCUMENTS

| | | | |
|---|---|---|---|
| 3,359,169 | 12/1967 | Slater | 424/157 |
| 3,499,963 | 3/1970 | Rubino | 424/157 |
| 3,509,253 | 4/1970 | Babbin | 424/47 |
| 4,360,599 | 11/1982 | Loken et al. | 501/147 |
| 4,372,786 | 2/1983 | Reed et al. | 106/900 |
| 4,377,419 | 3/1983 | Reed | 106/900 |
| 4,380,408 | 4/1983 | Loken et al. | 106/900 |
| 4,425,165 | 1/1984 | Bryhn et al. | 106/900 |
| 4,425,167 | 1/1984 | Bryhn | 106/900 |

Primary Examiner—Theodore Morris
Attorney, Agent, or Firm—Stephen A. Littlefield

[57] ABSTRACT

Process for retarding and controlling the formation of gels or precipitates derived from aluminum and corresponding compositions, plus the corresponding applications—in particular regarding oil wells.

5 Claims, 1 Drawing Sheet

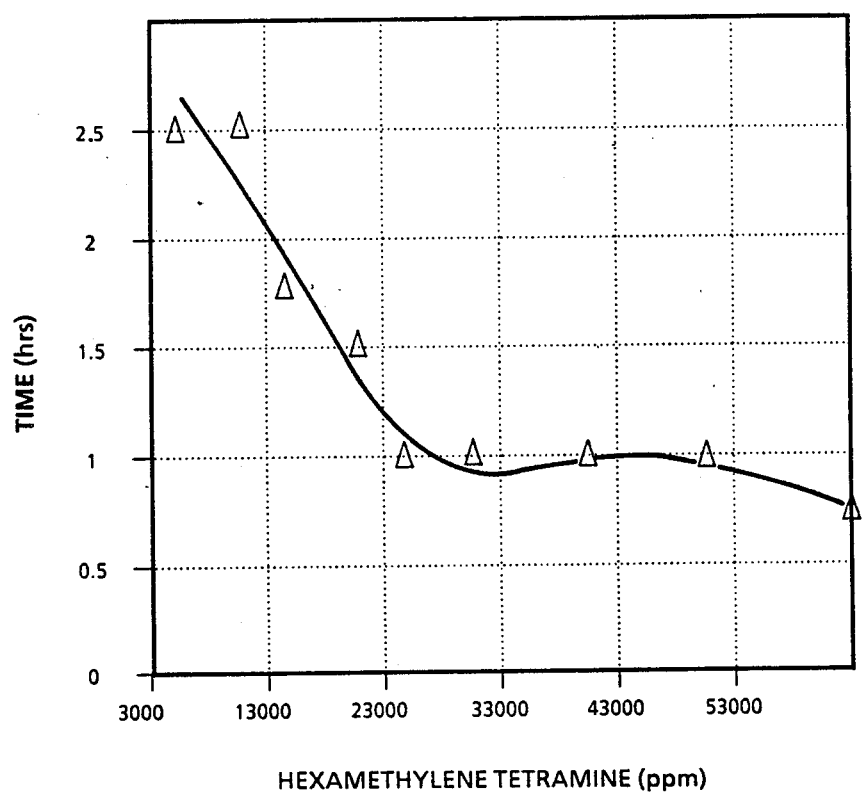

PROCESS FOR RETARDING AND CONTROLLING THE FORMATION OF GELS OR PRECIPITATES DERIVED FROM ALUMINIUM AND CORRESPONDING COMPOSITIONS, PLUS THE CORRESPONDING APPLICATIONS-IN PARTICULAR REGARDING OIL WELLS

The present invention covers compositions intended to retard and control the formation of gels or precipitates derived from aluminum, and has applications for the operation of oil wells.

During the production of hydrocarbons from underground formations, it is often desirable to reduce the permeability of certain zones in the formation. This is the case, for example, when a formation next to the production well is likely to direct water into the well. Another example is where there are zones of high permeability are next to the injection well.

One method of reducing the permeability of certain underground zones consists in precipitating a product in—situ—this technique is well understood and is usually employed by the placing of two incompatible fluids in the reservoir. This leads to formation of a precipitate, giving reduced permeability wherever the two fluids come into contact and mix inside the reservoir. The specialist is referred to U.S. Pat. Nos. 3,837,400; 4,031,958 and 4,304,301. A second possibility is in the introduction of a fluid designed to react with a particular component of the reservoir, such as inherent water in the latter, to form an insoluble precipitate. The specialist is referred to U.S. Pat. No. 3,837,400.

Another technique consists yet again in introducing a fluid with the intrinsic potential of creating a precipitate or a gel; this formation will nevertheless require delaying (by any means). The specialist is referred to U.S. Pat. Nos. 4,413,680 and 3,614,985.

To master the operation, it is essential to control two parameters, that is, the delay required in the formation of the gel or the precipitate, and the morphology of the solid phase that is produced; the delay in completing the reaction determines the possible degree of penetration into the formation, while the morphology of the solid phase determines the degree to which the permeability of the formation will be reduced.

U.S. Pat. No. 2,614,985 describes the precipitation of metal hydroxides such as chromium hydroxide or aluminum hydroxide, starting with a homogeneous solution.

Numerous simple salts of aluminum III (such as aluminum chloride or aluminum nitrate) are soluble in slightly acid mediums, but form insoluble aluminum hydroxides when the pH level goes above about.5. The previously cited patent describes the delayed formation of aluminum hydroxide-type compounds, by employing a solution consisting a suitable aluminum salt, and an activator. The activator is used to slowly increase the pH level of the solution 5 in the temperature ranges normally existing in the well bottom; this in turn leads to the delayed formation of an insoluble hydroxide phase. As stated in the present document, a suitable activator is urea, which undergoes hydrolysis at high temperature, with formation of ammonia; the latter in turn increases the pH of the solution. The solid aluminum hydroxide precipitate phase thus has a tendency to stay amorphous, with the consistency of a gel.

The only example of a practical system described in the above-mentioned patent concerns the precipitation of aluminum hydroxide starting with aluminum chloride. However, as it is described, this solution is not practically applicable to oilfield operations, whether from the point of view of safety, or on account of technical constraints: aluminum chloride in solid form reacts violently with water, giving off heat and hydrochloric acid vapours.

In the field, therefore, such a system would be extremely dangerous to handle. Additionally, the use of concentrated solutions of aluminum chloride is not desirable on account of the fluid volume required and the need to employ a corrosion inhibitor to protect the fluid-metering pumps. It is an established fact that corrosion inhibitors often affect treatment of the well.

Typical treatment solutions (approximately 0.05 to 0.15M Al 3+) have a pH of around 3, and, as recommended by the previously cited patent, it is preferable to adjust the pH to around 4. In fact, with a pH of 3, fluid interaction with the carbonates present in the porous medium is very rapid, and limits penetration of the fluid into the matrix. Even in the case of a very pure sandstone, where reaction with carbonates is not a problem, a pH of 3 requires a high concentration of urea to start the precipitation reaction, and thus a pH of 4 is preferred.

Unfortunately, with the system described in the above patent, this pH adjustment is impossible, or at best, impractical: addition of an alkaline agent to a typical aluminum chloride solution in fact produces immediate and inevitable precipitation, and while this precipitate does dissolve slowly over time and lead to a higher pH, its presence requires the use of discontinues mixing techniques. The latter can only be applied to high volumes of fluid, with operations lasting several days or several weeks, particularly since the operations are performed in very restricted areas. The precipitate will only redissolve when fresh water is available; where the mix water employed is not pure but rather the classic brine solutions found in oilfields, whether brine proper or sea water etc., the initial precipitate formed by the addition of the alkaline agent does not dissolve (even with heavy agitation at high temperature) for a long time. In such a case-which is frequently encountered-the problem has no solution.

One aspect of the present invention covers the use of an aluminum hydroxychloride as a "plugging agent". This polymeric salt is produced commercially by electrolysis of aluminum chloride solutions. In its crystalline form, it has the equation:

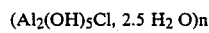

More generally, it has the form of an acid aluminum salt, with the general formula:

in which X is a mineral or organic anion (or mixture of mineral or organic anions), with $(p \times q) + m = 3n$, q being the valency of the anion and the ratio $(m/3n) \times 100$ defining the basicity of the said salt and situated between 30 and 80%.

Use of an aluminum hydroxychloride as a plugging agent solves the problems encountered with previous techniques, and also provides the specialist with new possibilities, particularly as regards the effective control of gelling time or precipitation, and monitoring of the morphology of the precipitate.

GEL: Where the zone of high permeability to be treated is simply and straight-forwardly a porous matrix, a solid phase consisting of a resilient gel will probably be preferred and will prove most effective in reducing flowrates within the said zone.

PARTICULATES: A precipitate consisting of solid particles may be preferred when the zone of high permeability is due both to a porous matrix and a fracture. In this case, the particles formed in the fracture will collect on the faces of the fracture where the flow occurs, and the corresponding areas will be sealed.

The aluminum hydroxychloride dissolves rapidly and totally, without releasing a high level of heat or hydrochloric acid gas. This in itself represents a considerable improvement as regards safety. The aluminum hydroxychloride is also available as a concentrated aqueous solution, for cases where liquid injection is absolutely essential at a given site, and this polymer salt has the additional advantage of being approximately twice as concentrated as commercially available aluminum chloride solutions, which have a pH of around 3 only.

As seen above, the overly-low pH level of the previous-technology aluminum chloride (generally between 2.8 and 3.2) meant the virtual impossibility of employing aluminum chloride-based fluids in reservoirs containing carbonates, since the precipitate that formed led to immediate blocking of the well, which obviously has to be totally avoided.

Even in the case of a pure sandstone, the problem can still arise, since sandstones contain a certain percentage of carbonates, and to achieve sufficient penetration of the fluid, it is preferable for the initial pH to be around 4 or 4.5. Such a pH level reduces undesirable interactions between the fluid and the reservoir, and also reduces the amount of urea necessary for starting the precipitation reaction.

Also noted is the virtual impossibility of raising the pH level of a simple aluminum salt (by practical means) using a caustic agent as described in U.S. Pat. No. 3,614,985—in actual fact, precipitation of the aluminum hydroxychloride occurs immediately, and requires recourse to discontinuous mixing techniques. It then becomes impossible to maintain a reasonable flowrate over several days, which constitutes an impossible constraint.

Using an aluminum hydroxychloride plus an activator such as urea provides a solution to these problems, since this polymeric salt dissolves rapidly and totally, leading to the formation of solutions with pH levels of between 4 and 4.5—this in turn ensures sufficient penetration into the reservoir without need for discontinuous techniques. On the contrary, continuous mixing techniques becomes a possibility.

A further aspect of the present invention demonstrates the possibility of using other weak bases apart from urea as the activator, again in unison with an aluminum hydroxychloride. The invention in particular proposes the use of an activator consisting of hexamethylene-tetramine, plus an aluminum hydroxychloride used as the plugging agent.

The following presentation is a non-exhaustive summary of the invention and the results obtained with both urea and heamethylene-tetramine.

It is known that two parameters are of the greatest importance when seeking to reduce the permeability of a porous medium by employing techniques as described above; these are the reaction time, and the morphology of the precipitate. The reaction times determines the penetration distance possible into a given reservoir, while the morphology of the solid phase determines the degree to which the permeability of the porous medium will be reduced.

Using the present invention, it has been found that a certain number of compounds have an unexpected yet completely necessary effect on the precipitation reaction of types of aluminum hydroxides when used with urea to give the hydrolysis reaction mentioned previously. Thus by using the invention, it becomes possible, using one or more these additives in the precipitation system, to accelerate or retard the reaction and thus adapt the morphology of the solid phase produced, allowing the formation of morphologies from non crystalline forms of gel, to small individual crystals of high density.

The additives discovered in the process of the present invention have an effect on either the reaction time or the morphology of the solid phase, and are anions-more generally, polyvalent anions such as tartrates, citrates, sulfates or lactates. Each of these ions has a different effect both on the morphology of the solid phase and on the reaction time, as the examples given below will demonstrate to the specialist.

The majority of polyvalent anions are accelerators, and consequently reduce considerably the time required for precipitation of the solid from the solution. Citrates and tartrates are the most active, but other anions such as oxalates, sulfates and lactates also have an accelerating effect.

The following examples represent a non-exhaustive summary of the invention, and provide the specialist with information necessary for selection of products and appropriate additives to ensure the desired result, for each specific field situation.

It will be noted that "LOCRON" is a solid aluminum hydroxychloride that meets the previously stated formula; it is marketed by HOECHST A.G., German Federal Republic.

Percentages shown are weight for volume, unless otherwise stated.

In the following tables, the symbols used are as follows:
GG: good gel
WG: weak gel
BG: broken gel
NG: no gel
S: syneresis
C: cloudy solution
Cl: clear solution
j: days
h: hours Example 1—Effect of temperature The solution used is 3% aluminum hydroxychloride (AHC) and 3% urea in distilled water; initial pH=4.2. At a temperature of 65° C. (149° F.), the gelling time is approximately 3 days.

Example 2—Effect of AHC concentration

The solution used is 3% urea and 5% AHC in distilled water, the initial pH being 4.2.

At a temperature of 65° C. (149° F.), the gelling time is approximately 80 hours.

Example 3—Effect of urea concentration

The solution used is 3% AHC and 1% urea in distilled water, the initial pH being 4.2.

At a temperature of 65° C. (149° F.), the gelling time is approximately 6 days.

Example 4—Effect of added salt

The solution used is 3% AHC and 3% urea in a 5% solution of NaCl.

At a temperature of 65°°C. (149° F.), the gelling time is approximately 30 hours.

Example 5—Additives under the invention having an accelerating function

Numerous anions, particularly bivalent anions, have the effect of accelerators in the reaction under study. The following are some examples of such additives.

1—"standard solution"=a solution of 3% aluminum hydroxychloride (AHC) and 3% urea; pH =4.3; temperature=65° C. (149° F.).

For this standard solution, the reaction considered leads to formation of a solid gel after a gelling time (Gt) of 72 hours.

2—Standard solution+sodium sulfate 0.01M; Gt=35 h.
3—Standard solution+sodium sulfate 0.03M; Gt=20 h.
4—Standard solution+citric acid 0.01M; GT=40 h.
5—Standard solution+citric acid 0.03M; Gt=30 h.
6—Standard solution+tartaric acid 0.01M; Gt=48 h.
7—Standard solution+tartaric acid 0.03M; Gt=35 h.
8—Standard solution+sodium fluoride 0.01M; Gt=52 h.
9—Standard solution+sodium fluoride 0.03M; Gt=40 h.
10—Standard solution+oxalic acid 0.01M; Gt=42 h.
11—Standard solution+oxalic acid 0.03M; Gt=33 h.
12—Standard solution+fumaric acid 0.01M; Gt=55 h.
13—Standard solution+fumaric acid 0.03M; Gt=38 h.
14—Standard solution+erythorbic acid 0.01M; Gt=55 h.
15—Standard solution+erythorbic acid 0.03M; Gt=46 h.

Example 6—Additives under the invention having a modifying effect on the morphology of the precipitate It will first be noted that additives having a tendency to create a gelatinous phase will be referred to as "gelling agents"; those having a tendency to encourage the formation of fine crystalling particles will be referred to as "crystallizing agents".

If necessary, it is possible to employ a gelling agent to compensate the effects of a crystallizing agent which might be naturally present in the mixing water.

The preferred gelling agents are citrates and tartrates.

the preferred crystallizing agents are sulfates, oxalates and succinates.

Gelling agents and crystallizing agents can be used either individually or in combinations in order to adapt the composition to various specific situations.

Example 7—Permeability tests (a) core sample: consolidated sandstone:
diameter: 5 cm
length: 15 cm
Initial permeability (3% NaCl)—115 mD Final permeability (3% NaCl)—53 mD (b) core sample: consolidated sandstone:
diameter: 5 cm
length: 15 cm
Initial permeability (3% NaCl)—420 mD Final permeability (3% NaCl)—126 mD (c) unconsolidated sandpack (i.e. a tube filled with uncompressed sand):

diameter: 8 cm
length: 30 cm
Initial permeability (3% NaCl)—1663 mD
Final permeability (3% NaCl)—130 mD (d) unconsolidated sandpack:
diameter: 8 cm
length: 55 cm
Initial permeability (3% NaCl)—2360 mD
Final permeability (3% NaCl)—49 mD (e) unconsolidated sandpack:
diameter: 8 cm
length: 55 cm
Initial permeability (3% NaCl)—9843 mD
Permeability after 1st treatment—3250 mD
Permeability after 2nd treatment—1004 mD The consolidated core samples were Fontainebleau sandstone; the sandpacks were mixtures of various Fontainebleau and Ottawa sands. Treatments consisted in injecting the above-defined standard solution into one-half of the pore volume, with added 5% citric acid, after which injection was halted for a period sufficient to allow formation of the solid phase.

Example 8—LOCRON+urea

Variables: % NaCl
Test temperature

Various solutions were prepared containing LOCRON aluminum hydroxychloride, urea and NaCl, and their temperatures raised up to the "test" temperature.

Observations were taken to detect formation or otherwise of a gel ("bottle test").

Composition of solution, test temperatures and results after a certain number of hours or days are represented in Tables I to VI below.

Example 9—LOCRON+urea

NaCl, $CaCl_2$ or sea water
Test temperature: 80° C. (176° F.)
The procedure is as for Example 8 above.

The LOCRON (aluminum hydroxychloride) concentration is 3% of weight for volume of the solution, as is the urea 30 concentration.

The composition of the sea water used is given in Table VII below.

The results obtained after a certain number of hours, together with the NaCl and $CaCl_2$ percentages are given Table VIII below.

Example 10—LOCRON+hexamethylene-tetramine ($C_6H_{12}N_4$)

Test temperature: 80° C. (176° F.)
NaCl: 1%

Procedure as for Examples 8 and 9 above. The concentration used are: LOCRON—3%; NaCl—1%.

The concentration used, together with the results obtained after a certain number of hours, are given in Table IX below.

Gelling times obtained with 1% NaCl and 3% LOCRON (at 80° C.) are also shown in the single figure (see attached drawing), as a function of the hexamethylene-tetramine concentration.

The specialist is free to use the tables herein for selection of the optimum parameters to fit a given well situation, for example, to meet treatment temperature constraints.

One of the principal advantages of the compositions stated in this invention rests in their compatibility with saline mediums.

It is appreciated that the presence of salts (NaCl, sea water and especially polyvalent calcium and magnesium salts) causes serious problems when applying treatments under the previous techniques as, for example, the use of polyacrylamide: with such a polymer, treatment cannot be effective if the Ca or Mg salts are present in more than 400 or 500 ppm.

On the other hand, the compositions mentioned in the invention can be used in the presence of salt levels of several percent—including calcium salts—or with sea water, which opens up possibilities in off-shore operations.

TABLE I

| Test temperature: 55° C. (131° F.) | | | | | | | |
|---|---|---|---|---|---|---|---|
| Test No. | 1 | 2 | 3 | 4 | 5 | 6 | 7 |
| NaCl | | 1% | | | | | |
| "LOCRON" | | 3% | | | | | |
| UREA (%) | 6 | 5 | 4 | 3 | 2.5 | 2 | 1.5 |
| 5j | GG | GG | NG | NG | NG | NG | NG |
| 6j | GG | GG | NG | NG | NG | NG | NG |
| 7j | GG | GG | GG | NG | NG | NG | NG |
| 8j | GG | GG | GG | NG | NG | NG | NG |
| 9j | GG | GG | GG | NG | NG | NG | NG |
| 10j | GG | GG | GG | Cl | Cl | NG | NG |
| 11j | GG | GG | GG | GG | GG | NG | NG |
| 14j | GG | GG | GG | GG | GG | Cl | NG |
| 17j | GG | GG | GG | GG | GG | GG | NG |

TABLE I-continued

| Test temperature: 55° C. (131° F.) | | | | | | | |
|---|---|---|---|---|---|---|---|
| 18j | GG | GG | GG | GG | GG | GG | Cl |
| Test No | 9 | 10 | 11 | 12 | 13 | 14 | 15 |
| NaCl | | | 1% | | | | |
| "LOCRON" | | | 3% | | | | |
| UREA (%) | 6 | 5 | 4 | 3 | 2.5 | 2 | 1.5 |
| 5j | NG | NG | NG | NG | NG | NG | Cl |
| 6j | NG | NG | NG | NG | NG | NG | GG |
| 7j | NG | NG | NG | NG | NG | GG | GG |
| 8j | NG | NG | NG | NG | Cl | GG | GG |
| 9j | NG | NG | NG | NG | GG | GG | GG |
| 12j | NG | NG | Cl | GG | GG | GG | GG |
| 13j | NG | NG | GG | GG | GG | GG | GG |
| Test No | 20 | 21 | 22 | 23 | 24 | 25 | 26 |
| NaCl | | | 3% | | | | |
| "LOCRON" | | | 3% | | | | |
| UREA (%) | 6 | 5 | 4 | 3 | 2.5 | 2 | 1.5 |
| 5j | GG | GG | NG | NG | NG | NG | NG |
| 6j | GG | GG | Cl | NG | NG | NG | NG |
| 7j | GG | GG | GG | Cl | NG | NG | NG |
| 10j | GG | GG | GG | GG | GG | Cl | NG |
| 11j | GG | GG | GG | GG | GG | GG | NG |
| 12j | GG | GG | GG | GG | GG | GG | Cl |
| 13j | GG | GG | GG | GG | GG | GG | Cl |
| 14j | GG | GG | GG | GG | GG | GG | GG |
| Test No. | 29 | 30 | 31 | 32 | 33 | 34 | 35 |
| NaCl | | | | 3% | | | |
| "LOCRON" | 6 | 5 | 4 | 3 | 2.5 | 2 | 1.5 |
| UREA (%) | | | | 3% | | | |
| 5j | NG | NG | NG | NG | NG | NG | Cl |
| 6j | NG | NG | NG | NG | NG | NG | WG |
| 7j | NG | NG | NG | NG | NG | NG | WG |
| 8j | NG | NG | NG | Cl | NG | Cl | WG |
| 9j | NG | NG | NG | Cl | GG | GG | WG |
| 12j | NG | NG | Cl | GG | GG | GG | WG |
| 13j | NG | NG | WG | GG | GG | GG | WG |

TABLE II

| Test temperature: 55° C. (150° F.) | | | | | | | | | |
|---|---|---|---|---|---|---|---|---|---|
| Test No. | 1 | 2 | 3 | 4 | 5 | 6 | 7 | 8 | 9 |
| NaCl | | | | 1% | | | | | |
| "LOCRON" (%) | 3 | 3 | 3 | 3 | 3 | 2.5 | 2 | 1.5 | 1 |
| UREA (%) | 3 | 2.5 | 2 | 1.5 | 1 | 3 | 3 | 3 | 3 |
| 18h | NG | NG | NG | NG | NG | NG | NG | NG | NG |
| 25h | " | " | " | " | " | " | " | " | WG |
| 39h | " | " | " | " | " | " | C | C | WG |
| 45h | " | " | " | " | " | " | GG | GG | WG |
| 48h | " | " | " | " | " | " | WG | GG | WG |
| 63h | C | " | " | " | " | GG | BG | BG | WG |
| 66h | GG | " | " | " | " | GG | S | S | WG |
| 68h | GG | " | " | " | " | GG | | | " |
| 71h | GG | C | " | " | " | GG | | | " |
| 88h | GG | GG | C | " | " | S | | | " |
| 93h | GG | GG | C | " | " | | | | " |
| 95h | GG | GG | SG | " | " | | | | " |
| 134h | | | GG | GG | Cl | | | | " |
| 140h | S | S | S | GG | Cl | S | S | S | WG |
| 164h | S | S | S | GG | NG | S | S | S | WG |
| Test No. | 10 | 11 | 12 | 13 | 14 | 15 | 16 | 17 | 18 |
| NaCl | | | | 3% | | | | | |
| "LOCRON" (%) | 3 | 3 | 3 | 3 | 3 | 2.5 | 2 | 1.5 | 1 |
| UREA (%) | 3 | 2.5 | 2 | 1.5 | 1 | 3 | 3 | 3 | 3 |
| 18h | NG | NG | NG | NG | NG | NG | NG | NG | C |
| 25h | " | " | " | " | " | " | " | C | C |
| 39h | " | " | " | " | " | C | C | C | C |
| 45h | " | " | " | " | " | GG | GG | WG | WG |
| 48h | C | " | " | " | " | GG | GG | WG | WG |
| 63h | GG | GG | " | " | " | GG | GG | WG | WG |
| 66h | GG | GG | " | " | " | BG | BG | " | " |
| 68h | GG | GG | " | " | " | S | S | " | " |
| 71h | GG | GG | C | " | " | | | " | " |
| 88h | GG | GG | GG | C | " | | | " | " |
| 93h | | | | C | " | | | " | " |
| 134h | BG | BG | BG | BG | GG | | | " | " |
| 140h | S | S | S | S | GG | | | " | " |

TABLE II-continued

| Test temperature: 55° C. (150° F.) | | | | | | | | | |
|---|---|---|---|---|---|---|---|---|---|
| 164h | S | S | S | S | GG | S | S | WG | WG |

TABLE III

Test temperature: 70° C. (158° F.)

| Test No. | 1 | 2 | 3 | 4 | 5 | 6 | 7 |
|---|---|---|---|---|---|---|---|
| NaCl | | | 1% | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 18h | NG | NG | NG | NG | NG | NG | NG |
| 20h | " | " | " | " | " | " | C |
| 24h | " | " | " | " | " | C | GG |
| 26.5h | " | " | " | " | " | GG | " |
| 32h | " | " | " | " | " | " | " |
| 41h | GG | C | " | " | " | " | " |
| 45.5h | " | GG | C | " | " | " | " |
| 50.5h | " | " | GG | " | " | " | " |
| 65h | " | " | " | C | " | " | " |
| 69.5h | " | " | " | GG | " | " | " |
| 73h | " | " | " | " | " | " | " |

| Test No. | 10 | 11 | 12 | 13 | 14 | 15 | 16 |
|---|---|---|---|---|---|---|---|
| NaCl | | 3% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 18h | NG | NG | NG | NG | NG | NG | NG |
| 20h | " | " | " | " | " | C | " |
| 22.5h | " | " | " | " | " | GG | " |
| 28h | WG | C | " | " | " | " | " |
| 32h | GG | C | " | " | " | " | " |
| 41h | " | GG | GG | " | " | " | " |
| 45.5h | " | " | " | C | " | " | " |
| 50.5h | " | " | " | " | " | " | " |
| 65h | " | " | " | GG | " | " | " |
| 73h | " | " | " | " | " | " | " |

TABLE IV

Test temperature: 70° C. (167° F.)

| Test No. | 1 | 2 | 3 | 4 | 5 | 6 | 7 |
|---|---|---|---|---|---|---|---|
| NaCl | | 1% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 14h | NG | NG | NG | NG | NG | GG | GG |
| 17.5h | " | " | " | " | " | " | " |
| 20h | GG | " | " | " | " | " | " |
| 22.5h | " | " | " | " | " | " | " |
| 23.5h | " | C | " | " | " | " | " |
| 24h | " | C | C | " | " | " | " |
| 26h | " | GG | GG | Cl | Cl | " | " |
| 27h | " | " | " | " | " | S | S |
| 28.5h | " | " | " | " | " | " | " |
| 29.5h | " | " | " | C | " | " | " |
| 38h | " | " | " | GG | " | " | " |
| 43.5h | " | " | " | " | WG | " | " |

| Test No. | 10 | 11 | 12 | 13 | 14 | 15 | 16 |
|---|---|---|---|---|---|---|---|
| NaCl | | 3% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 14h | GG | C | NG | NG | NG | GG | GG |
| 17.5h | " | GG | C | " | " | " | " |
| 20h | " | " | GG | " | " | S | S |
| 22.5h | " | " | " | C | " | " | " |
| 23.5h | " | " | " | " | " | " | " |
| 24h | " | " | " | " | " | " | " |
| 26h | " | " | " | GG | " | " | " |
| 27h | " | " | " | " | " | " | " |
| 29.5h | " | " | " | " | " | " | " |
| 38h | " | " | " | " | GG | " | " |

TABLE V

Test temperature 79° C. (174° F.)

| Test No. | 1 | 2 | 3 | 4 | 5 | 6 | 7 |
|---|---|---|---|---|---|---|---|
| NaCl | | 1% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 7h | NG | NG | NG | NG | NG | NG | NG |
| 8.5h | " | " | " | " | " | C | C |
| 9h | " | " | " | " | " | GG | GG |
| 10h | " | " | " | " | " | " | " |
| 12h | C | " | " | " | " | " | " |
| 13h | GG | C | C | " | " | " | " |
| 13.5h | " | GG | " | " | " | " | " |
| 14h | " | " | " | " | " | " | " |
| 15.5h | " | " | GG | " | " | " | " |
| 16h | " | " | " | C | " | " | " |
| 24h | " | " | " | GG | " | " | " |
| 26h | " | " | " | " | GG | " | " |

| Test No. | 10 | 11 | 12 | 13 | 14 | 15 | 16 |
|---|---|---|---|---|---|---|---|
| NaCl | | 3% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 7h | NG | NG | NG | NG | NG | GG | GG |
| 8.5h | " | " | " | " | " | " | " |
| 9h | C | C | " | " | " | " | " |
| 10h | GG | " | " | " | " | " | " |
| 12h | " | GG | C | " | " | " | " |
| 13h | " | " | WG | " | " | " | " |
| 14.5h | " | " | GG | C | " | " | " |
| 15.5h | " | " | " | GG | " | " | " |
| 16h | " | " | " | " | " | " | " |
| 24h | " | " | " | " | GG | " | " |

TABLE VI

Test temperature 90° C. (194° F.)

| Test No. | 1 | 2 | 3 | 4 | 5 | 6 | 7 |
|---|---|---|---|---|---|---|---|
| NaCl | | 1% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 5h | NG | NG | NG | NG | NG | NG | NG |
| 6h | GG | C | " | " | " | GG | GG |
| 7h | " | GG | " | " | " | " | " |
| 8h | " | " | GG | " | " | " | " |
| 9h | " | " | " | C | " | " | " |
| 10h | " | " | " | GG | " | " | " |
| 14h | " | " | " | " | WG | " | " |

| Test No. | 10 | 11 | 12 | 13 | 14 | 15 | 16 |
|---|---|---|---|---|---|---|---|
| NaCl | | 3% | | | | | |
| "LOCRON" (%) | 3 | 3 | 3 | 3 | 3 | 2.5 | 2 |
| UREA (%) | 3 | 2.5 | 2 | 1.5 | 1 | 3 | 3 |
| 5h | NG | NG | NG | NG | NG | C | C |
| 6h | GG | C | C | " | " | GG | GG |
| 7h | " | GG | C | " | " | " | " |
| 8h | " | " | GG | C | " | " | " |
| 9h | " | " | " | GG | " | " | " |
| 14h | " | " | " | " | WG | " | " |

TABLE VII

| COMPONENT | Sea water CONCENTRATION (g/l) |
|---|---|
| NaCl | 24.53 |
| $MgCl_2, 6H_2O$ | 11.1 |
| $Na_2SO_4 10H_2O$ | 9.3 |
| $CaCl_2, 2H_2O$ | 1.54 |

TABLE VII-continued

| Sea water | |
|---|---|
| COMPONENT | CONCENTRATION (g/l) |
| KCl | 0.70 |
| NaHCO$_3$ | 0.20 |
| KBr | 0.10 |
| H$_3$BO$_3$ | 0.03 |
| SrCl$_2$, 6H$_2$O | 0.04 |
| NaF | 0.003 | pH = 8 (approx.)

TABLE VIII

80° C. (176° F.); 3% "LOCRON"; 3% Urea

| Test No. | 1 | 2 | 3 | 4 | 5 | 6 | 7 |
|---|---|---|---|---|---|---|---|
| NaCl (%) | 1 | 2 | 4 | 6 | 8 | 10 | Sea water |
| CaCl (%) | 0 | 0 | 0 | 0 | 0 | 0 | |
| 3h | Cl | Cl | Cl | Cl | Cl | Cl | C |
| 5h | " | " | " | " | " | " | GG |
| 6h | " | " | " | C | WG | WG | " |
| 7h | " | " | C | WG | " | " | " |
| 9h | " | " | WG | " | " | " | " |
| 24h | GG | WG | " | " | " | " | " |

| No. | 8 | 9 | 10 | 11 | 12 | 13 |
|---|---|---|---|---|---|---|
| NaCl % | 0 | 0 | 4 | 4 | 8 | 8 |
| CaCl$_2$ % | 1 | 2 | 1 | 2 | 1 | 2 |
| 3h | Cl | Cl | Cl | Cl | Cl | Cl |
| 5h | " | " | " | " | " | " |
| 6h | " | " | " | " | C | C |
| 7h | " | " | " | C | WG | WG |
| 9h | " | " | WG | WG | " | " |
| 24h | WG | WG | " | " | " | " |

TABLE IX

80° C. (176° F.), "LOCRON" 3%

| No. | 1 | 2 | 3 | 4 | 5 | 6 | 7 |
|---|---|---|---|---|---|---|---|
| "LOCRON" % | 3 | 3 | 3 | 3 | 3 | 3 | 3 |
| NaCl (%) | | | 1% | | | | |
| H.T (ppm) | 100 | 200 | 300 | 400 | 500 | 700 | 800 |
| 2h | NG | NG | NG | NG | NG | C | C |
| 2.5h | " | " | " | " | " | " | " |
| 3h | " | " | " | " | " | GG | GG |
| 5h | " | " | " | " | C | " | " |
| 6h | " | " | " | " | WG | " | " |
| 7h | " | " | " | " | GG | " | " |
| 15.5h | NG | NG | NG | C | " | GG | GG |
| 24h | " | " | " | " | " | " | " |
| 48h | " | " | " | " | " | " | " |
| 100h | " | " | " | " | " | " | " |

| No. | 8 | 9 | 10 | 11 | 12 | 13 | 14 |
|---|---|---|---|---|---|---|---|
| "LOCRON" % | 3 | 3 | 3 | 3 | 3 | 3 | 3 |
| NaCl (%) | | | 1% | | | | |
| H.T (%) | 0.1 | 0.15 | 0.2 | 0.25 | 0.5 | 1 | 1.5 |
| 0.75h | NG | NG | NG | | NG | NG | NG |
| 1h | " | " | " | | " | " | C |
| 1.5h | " | " | " | | " | " | WG |
| 1.75h | C | C | C | | " | C | GG |
| 2h | GG | GG | GG | | C | WG | " |

TABLE IX-continued

80° C. (176° F.), "LOCRON" 3%

| | | | | | | | |
|---|---|---|---|---|---|---|---|
| 2.5h | " | " | " | | GG | GG | " |
| 3h | " | " | " | | " | " | " |
| 5h | " | " | " | | " | " | " |
| 6h | " | " | " | | " | " | " |

| No. | 15 | 16 | 17 | 18 | 19 | 20 |
|---|---|---|---|---|---|---|
| "LOCRON" % | 3 | 3 | 3 | 3 | 3 | 3 |
| NaCl (%) | | 1% | | | | |
| H.T (%) | 2 | 2.5 | 3 | 4 | 5 | 6 |
| 0.75h | C | C | C | C | WG | WG |
| 1h | WG | GG | GG | GG | GG | " |
| 1.5h | G | " | " | " | " | " |

Note: HT = hexamethylene-tetramine

We claim:

1. A process for retarding and controlling the formation of gels or precipitates derived from aluminum comprising providing a partially neutralized acid aluminum salt in an aqueous solution with an activator selected from urea and hexamethylene-tetramine, wherein said partially neutralized acid aluminum salt has the formula:

$$Al_2(OH)_5Cl, 2.5\ H_2O.$$

2. The process as set forth in claim 1, wherein the precipitate has a morphology which is selected by employing gelling or crystallizing additives wherein said gelling additives are anions selected from citrate and tartrate and crystallizing additives are anions selected from sulfate, oxalate and succinate.

3. Delayed precipitation compositions producing gels or particulates comprising an aqueous solution of a partially neutralized acid aluminum salt and an activator selected from a group consisting of urea and hexamethylene-tetramine, wherein the aluminum salt has a general formula:

$$Al_n(OH)_m X_p$$

where x is a mineral or organic anion (or mixture of mineral or organic anions), with $(p \times q) + m = 3n$, q being the valence of the anion, and the ratio $(m/3n) \times 100$ defining the basicity of the said salt and situated between 30 and 80%.

4. The delayed precipitation composition as set forth in claim 3 wherein said partially neutralized acid aluminum salt comprises aluminum hydroxychloride having the formula:

$$Al_2(OH)_5Cl, 2.5\ H_2O$$

5. The delayed precipitation composition as set forth in claim 3 further including an accelerator and/or gelling and/or crystallizing agent selected from the following:
gelling agents: anions selected from citrate and tartrate;
crystallizing agents: anions selected from sulfate, oxalate and succinate.

* * * * *